(12) United States Patent
Choi et al.

(10) Patent No.: US 12,713,156 B2
(45) Date of Patent: Aug. 18, 2026

(54) SYSTEM ON CHIP AND METHOD FOR OPERATING SYSTEM ON CHIP

(71) Applicant: Samsung Electronics Co., Ltd., Suwon-si (KR)

(72) Inventors: Chang Hoon Choi, Suwon-si (KR); Hyun Yup Kwak, Suwon-si (KR); Yong Mi Lee, Suwon-si (KR); Seung Won Choi, Suwon-si (KR); Jong Seong Choi, Suwon-si (KR); Sung Jin Huh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 18/738,376

(22) Filed: Jun. 10, 2024

(65) Prior Publication Data

US 2025/0047999 A1 Feb. 6, 2025

(30) Foreign Application Priority Data

Aug. 3, 2023 (KR) ........................ 10-2023-0101493

(51) Int. Cl.
*H04N 25/771* (2023.01)
*H04N 9/64* (2023.01)
(Continued)

(52) U.S. Cl.
CPC ........... *H04N 25/771* (2023.01); *H04N 25/41* (2023.01); *H04N 25/60* (2023.01); *H04N 9/646* (2013.01)

(58) Field of Classification Search
CPC ...... H04N 25/771; H04N 25/41; H04N 25/60; H04N 9/646; H04N 25/11; H04N 25/79; H04N 25/68; H04N 25/46
(Continued)

(56) References Cited

U.S. PATENT DOCUMENTS 8,005,297 B2 8/2011 Hung et al.
8,077,253 B2 12/2011 Hosokawa et al.
(Continued)

FOREIGN PATENT DOCUMENTS

JP 2008258909 A 10/2008

OTHER PUBLICATIONS

El-Yamany, Noha, "Robust defect pixel detection and correction for bayer imaging systems", Electronic Imaging, 2017(15), 2017, 46-51.
(Continued)

*Primary Examiner* — Lin Ye
*Assistant Examiner* — Chan T Nguyen
(74) *Attorney, Agent, or Firm* — Wolf, Greenfield & Sacks, P.C.

(57) ABSTRACT

A system on chip and method for operating a system on chip are provided. A system on chip includes a shared memory configured to store image data and a processor configured to: generate a first correction value by performing first image processing for a first pixel value of a first pixel of the image data received from the shared memory, generate a second correction value by performing second image processing, which is different from the first image processing, for the first pixel value of the image data received from the shared memory, generate a third correction value by performing third image processing, which is different from the first image processing and the second image processing, for the first pixel value of the image data received from the shared memory, and output a first pixel correction value that is changed from the first pixel value by comparing the first to third correction values with the first pixel value and selecting one of the first to third correction values.

11 Claims, 20 Drawing Sheets

(51) Int. Cl.
*H04N 25/40* (2023.01)
*H04N 25/60* (2023.01)

(58) Field of Classification Search
USPC .......................................................... 348/242
See application file for complete search history.

(56) References Cited

U.S. PATENT DOCUMENTS

| | | | | |
|---|---|---|---|---|
| 8,358,319 | B2 | 1/2013 | Côté et al. | |
| 8,395,708 | B2 | 3/2013 | Lee et al. | |
| 8,792,025 | B2 * | 7/2014 | Kanemitsu | H04N 23/741 348/241 |
| 8,964,069 | B2 | 2/2015 | Kanemitsu et al. | |
| 8,971,659 | B2 | 3/2015 | Forutanpour | |
| 9,749,559 | B2 * | 8/2017 | Tanaka | H04N 25/633 |
| 10,291,872 | B2 | 5/2019 | Kim | |
| 10,643,306 | B2 | 5/2020 | Hwang et al. | |
| 10,715,813 | B2 * | 7/2020 | Wu | H04N 19/593 |
| 10,951,843 | B2 | 3/2021 | Lin et al. | |
| 11,924,568 | B2 * | 3/2024 | Murozuka | H04N 5/06 |
| 2005/0030412 | A1 | 2/2005 | Nakayama | |
| 2010/0026722 | A1 * | 2/2010 | Kondo | G09G 5/02 345/660 |
| 2012/0008017 | A1 * | 1/2012 | Jeong | H04N 25/683 348/E9.037 |
| 2018/0184028 | A1 * | 6/2018 | Saragaglia | H04N 25/671 |

OTHER PUBLICATIONS

Getman, et al., "Crosstalk, color tint and shading correction for small pixel size image sensor", International Image Sensor Workshop, 2007, 166-169.

Lebrun, Marc, "An analysis and implementation of the BM3D image denoising method", Image Processing On Line, 2, 2012, 175-213.

* cited by examiner

FIG. 1

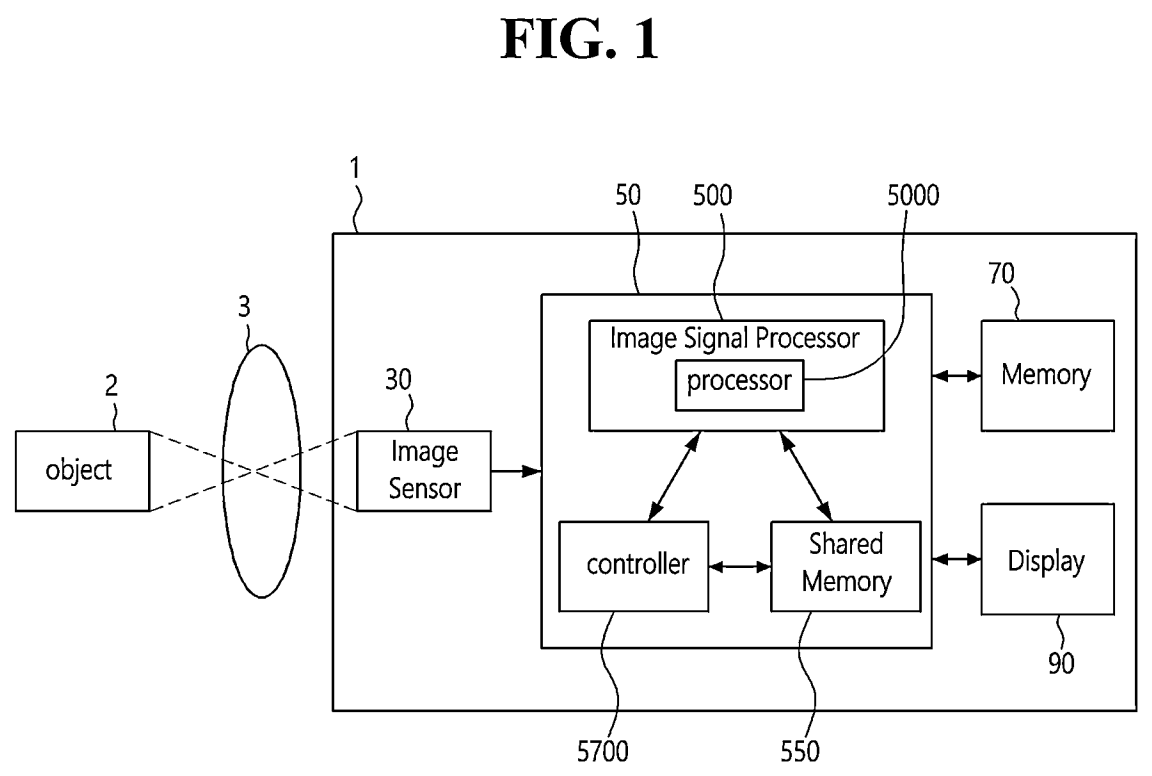

1
30 Image Sensor
50
500 Image Signal Processor
5000 processor
550 Shared Memory
5700 controller
70 Memory
90 Display
3
2 object

| GR1 | R1 | GR2 | R2 |
| --- | --- | --- | --- |
| B1 | GB1 | B2 | GB2 |
| GR3 | R3 | GR4 | R4 |
| B3 | GB3 | B4 | GB4 |

FIG. 9

SIG_I

| GR1 | R1 | GR2 | R2 | GR3 |
|---|---|---|---|---|
| B1 | GB1 | B2 | GB2 | B3 |
| GR4 | R4 | GR5 | R5 | GR6 |
| B4 | GB4 | B5 | GB5 | B6 |
| GR7 | R7 | GR8 | R8 | GR9 |

FIG. 10

SIG_I

| GR1 | R1 | GR2 | R2 | GR3 |
|---|---|---|---|---|
| B1 | GB1 | B2 | GB2 | B3 |
| GR4 | R4 | GR5 | R5 | GR6 |
| B4 | GB4 | B5 | GB5 | B6 |
| GR7 | R7 | GR8 | R8 | GR9 |

FIG. 11

SIG_1

SIG_1

SIG_I

| GR1 | R1 | GR2 | R2 | GR3 |
|---|---|---|---|---|
| B1 | GB1 | B2 | GB2 | B3 |
| GR4 | R4 | GR5 | R5 | GR6 |
| B4 | GB4 | B5 | GB5 | B6 |
| GR7 | R7 | GR8 | R8 | GR9 |

FIG. 15

SIG_I

| GR1 | R1 | GR2 | R2 | GR3 |
|---|---|---|---|---|
| B1 | GB1 | B2 | GB2 | B3 |
| GR4 | R4 | GR5 | R5 | GR6 |
| B4 | GB4 | B5 | GB5 | B6 |
| GR7 | R7 | GR8 | R8 | GR9 |

FIG. 16

SIG_2

SIG_I

| GR1 | R1 | GR2 | R2 | GR3 |
| --- | --- | --- | --- | --- |
| B1 | GB1 | B2 | GB2 | B3 |
| GR4 | R4 | GR5 | R5 | GR6 |
| B4 | GB4 | B5 | GB5 | B6 |
| GR7 | R7 | GR8 | R8 | GR9 |

FIG.18

SIG_3

GR5'

SYSTEM ON CHIP AND METHOD FOR OPERATING SYSTEM ON CHIP

CROSS-REFERENCE TO RELATED APPLICATION

This application claims priority under 35 U.S.C. 119 to Korean Patent Application No. 10-2023-0101493 filed on Aug. 3, 2023, in the Korean Intellectual Property Office, the contents of which in its entirety are herein incorporated by reference.

BACKGROUND

Technical Field

The present disclosure relates to a system on chip and a method for operating the system on chip.

Description of the Related Art

An image sensing device may be used, for example, in a mobile device, such as a smart phone, a tablet PC, a digital camera, or various other types of electronic devices. The image sensing device includes fine pixels configured in a two-dimensionally integrated form, and converts an electrical signal corresponding to brightness of incident light into a digital signal and outputs the digital signal. In this case, the image sensing device includes an analog-to-digital converter to convert an analog signal corresponding to brightness of light into a digital signal.

Examples of the image sensor include a charge coupled device (hereinafter, referred to as "CCD") image sensor and a Complementary Metal-Oxide Semiconductor (CMOS) image sensor. The CCD image sensor has less noise and better image quality than the CMOS image sensor. The CMOS image sensor has a simple driving mode, and may be implemented in various scanning modes. In addition, because the CMOS image sensor may integrate signal processing circuits in a single chip, it is relatively easy to miniaturize a product, and CMOS process technologies may be used so that the manufacturing cost is generally low. The CMOS image sensor may be easily applied to mobile devices due to generally very low power consumption.

The CMOS image sensor may be abbreviated as a CIS (CMOS image sensor). The CIS may include a plurality of pixels that are two-dimensionally arranged. Each of the pixels may include, for example, a photodiode (PD). The photodiode may serve to convert incident light into an electrical signal.

With the recent developments in the computer industry and communication industry, the demand for an image sensor having improved performance has increased in various applications, such as a digital camera, a camcorder, a smart phone, a game device, a security camera, a medical micro camera, and a robot.

SUMMARY

An embodiment of the present disclosure may provide a system on chip having a reduced area.

A further embodiment of the present disclosure may provide a method for operating a system on chip having a reduced area.

The embodiments of the present disclosure are not limited to those mentioned above and additional embodiments of the present disclosure, which are not mentioned herein, will be clearly understood by those skilled in the art from the following description.

According to an aspect of the present disclosure, there is provided a system on chip comprising: a shared memory configured to store image data and a processor configured to: generate a first correction value by performing first image processing for a first pixel value of a first pixel of the image data received from the shared memory, generate a second correction value by performing second image processing, which is different from the first image processing, for the first pixel value of the image data received from the shared memory, generate a third correction value by performing third image processing, which is different from the first image processing and the second image processing, for the first pixel value of the image data received from the shared memory, and output a first pixel correction value that is changed from the first pixel value by comparing the first to third correction values with the first pixel value and selecting one of the first to third correction values.

According to another aspect of the present disclosure, there is provided a system on chip comprising: a shared memory in which first image data and second image data are sequentially stored and a processor configured to perform image processing for the first and second image data, wherein the processor is configured to: perform first to third image processing, which are different from one another, for a first pixel value of the first image data in parallel, output a first pixel correction value obtained by changing the first pixel value responsive to the first image processing, perform the first to third image processing, which are different from one another, for a second pixel value of the second image data in parallel, and output a second pixel correction value obtained by changing the second pixel value responsive to the second image processing.

According to another aspect of the present disclosure, there is provided a method for operating a system on chip, the method comprising: generating a first correction value by performing first image processing for a first pixel value of a first pixel of first image data provided from a shared memory, generating a second correction value by performing second image processing, which is different from the first image processing, for the first pixel value of the first image data provided from the shared memory, generating a third correction value by performing third image processing, which is different from the first image processing and the second image processing, for the first pixel value of the first image data provided from the shared memory, outputting a first pixel correction value that is changed from the first pixel value by comparing the first to third correction values with the first pixel value and selecting one of the first to third correction values, generating a fourth correction value by performing the first image processing for a second pixel value of a second pixel of second image data that is different from the first image data and provided from the shared memory, generating a fifth correction value by performing second image processing, which is different from the first image processing, for the second pixel value of the second image data provided from the shared memory, generating a sixth correction value by performing third image processing, which is different from the first image processing and the second image processing, for the second pixel value of the second image data provided from the shared memory and outputting a second pixel correction value that is changed from the second pixel value by comparing the fourth to sixth correction values with the second pixel value and selecting one of the fourth to sixth correction values.

BRIEF DESCRIPTION OF THE DRAWINGS

FIG. 1 is a block diagram illustrating an image sensing device according to some embodiments.

FIG. 5 is a view illustrating a pixel array of FIG. 4 according to some embodiments.

FIGS. 9 to 12 are views illustrating an operation of a DPC module according to some embodiments.

FIGS. 14 to 16 are views illustrating an operation of a DISP module according to some embodiments.

FIGS. 17 and 18 are views illustrating an operation of a DNS module according to some embodiments.

DETAILED DESCRIPTION OF THE DISCLOSURE

Figure 2:
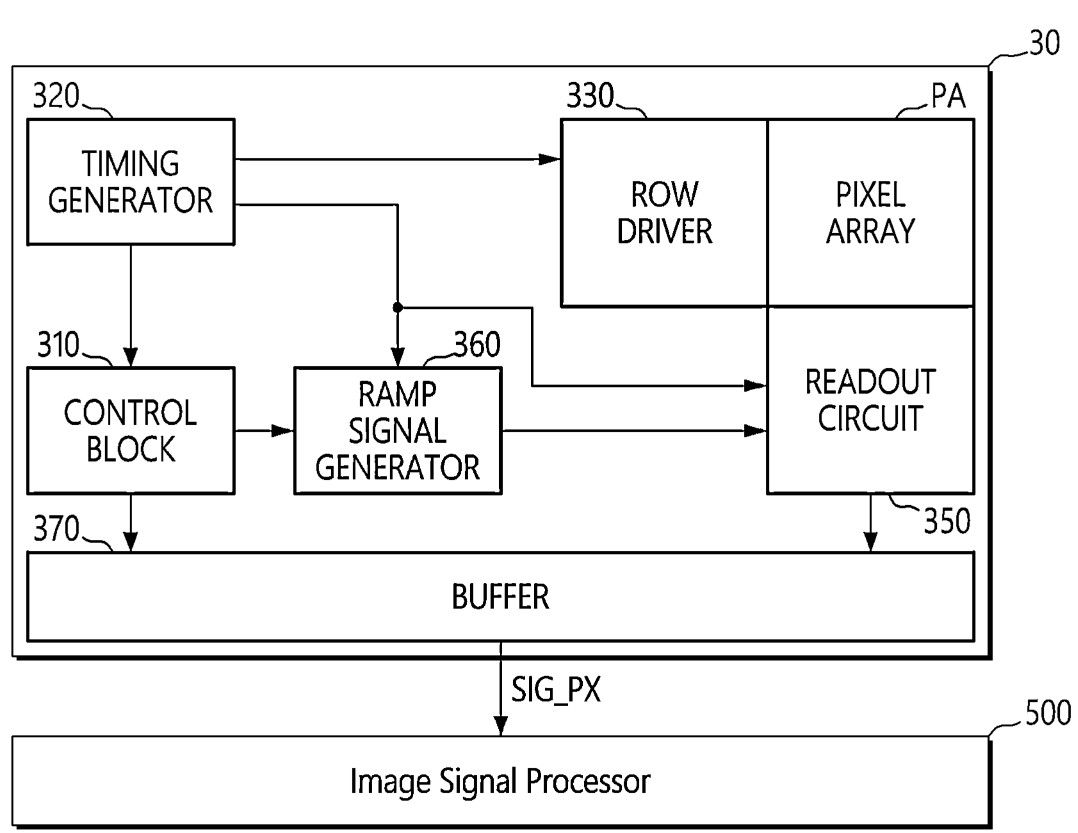
FIG. 2 is a block diagram illustrating the image sensor and the image signal processor in the image sensing device shown in FIG. 1.

Hereinafter, embodiments will be described in detail with reference to the accompanying drawings. Like reference numerals in the drawings denote like elements, and thus their description will be omitted. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination. Terms such as "unit" and "module" used in the present disclosure or functional blocks shown in the drawings may be implemented in the form of hardware, software or combination thereof configured to perform a specific function.

Hereinafter, a method of operating an image signal processor, a system on chip and an electronic device according to some embodiments will be described with reference to the accompanying drawings.

FIG. 1 is a block diagram illustrating an image sensing device according to some embodiments. FIG. 2 is a block diagram illustrating the image sensor and the image signal processor in the image sensing device shown in FIG. 1.

Referring to FIGS. 1 and 2, an image sensing device 1 according to some embodiments may be implemented as a portable electronic device, for example, but not limited to, a digital camera, a camcorder, a mobile phone, a smart phone, a tablet personal computer (PC), a personal digital assistant (PDA), a mobile Internet device (MID), a wearable computer, an Internet of Things (IoT) device, or an Internet of Everything (IoE) device.

The image sensing device 1 may include an image sensor 30, a system on chip 50, a memory 70, and a display 90.

The image sensor 30 senses an object 2 photographed through a lens 3 to generate a pixel signal SIG_PX. The generated pixel signal SIG_PX may be, for example, a digital signal, but the embodiments of the present disclosure are not limited thereto. The image sensor 30 may be, for example, a CMOS image sensor.

The image sensor 30 may include a control register block 310, a timing generator 320, a row driver 330, a pixel array PA, a readout circuit 350, a ramp signal generator 360, and a buffer 370.

The control register block 310 may control the overall operation of the image sensor 30. In particular, the control register block 310 may directly transmit an operation signal to the timing generator 320, the ramp signal generator 360 and the buffer 370.

The timing generator 320 may generate a signal that is a reference for timing the operations of various components of the image sensor 30. The operation timing reference signal generated by the timing generator 320 may be transferred or communicated to the row driver 330, the readout circuit 350, the ramp signal generator 360 and the like.

The ramp signal generator 360 may generate and transmit or communicate a ramp signal used in the readout circuit 350. For example, the readout circuit 350 may include a correlated double sampler CDS, a comparator and the like, and the ramp signal generator 360 may generate and transmit or communicate the ramp signal used for the correlated double sampler CDS, the comparator and the like.

The buffer 370 may include, for example, a latch unit. The buffer 370 may temporarily store the pixel signal SIG_PX to be provided to the outside, i.e., a destination external to the image sensing device 1, and may transmit the pixel signal SIG_PX to an external memory or an external device, i.e., a memory or device external to the image sensing device 1. The buffer 370 may include a memory such as DRAM or SRAM.

The pixel array PA may sense an external image. The pixel array PA may include a plurality of pixels (or unit pixels). The row driver 330 may selectively activate rows of the pixel array PA.

The readout circuit 350 may sample the pixel signal received from the pixel array PA, compare the sampled pixel signal with the ramp signal and then convert an analog image signal (data) into a digital image signal (data) based on the compared result.

The system on chip 50 may include an image signal processor (ISP) 500 and a shared memory 550. The pixel signal SIG_PX may be provided to the image signal processor 500 and then processed. The image signal processor 500 may receive the pixel signal SIG_PX output from the buffer 370 of the image sensor 30 and process the received pixel signal SIG_PX for the display.

In some embodiments, the image signal processor 500 may perform digital binning for the pixel signal SIG_PX output from the image sensor 30. The pixel signal SIG_PX output from the image sensor 30 may be a raw image signal from the pixel array PA without analog binning, or may be the pixel signal SIG_PX for which analog binning has been already performed.

Figure 6:
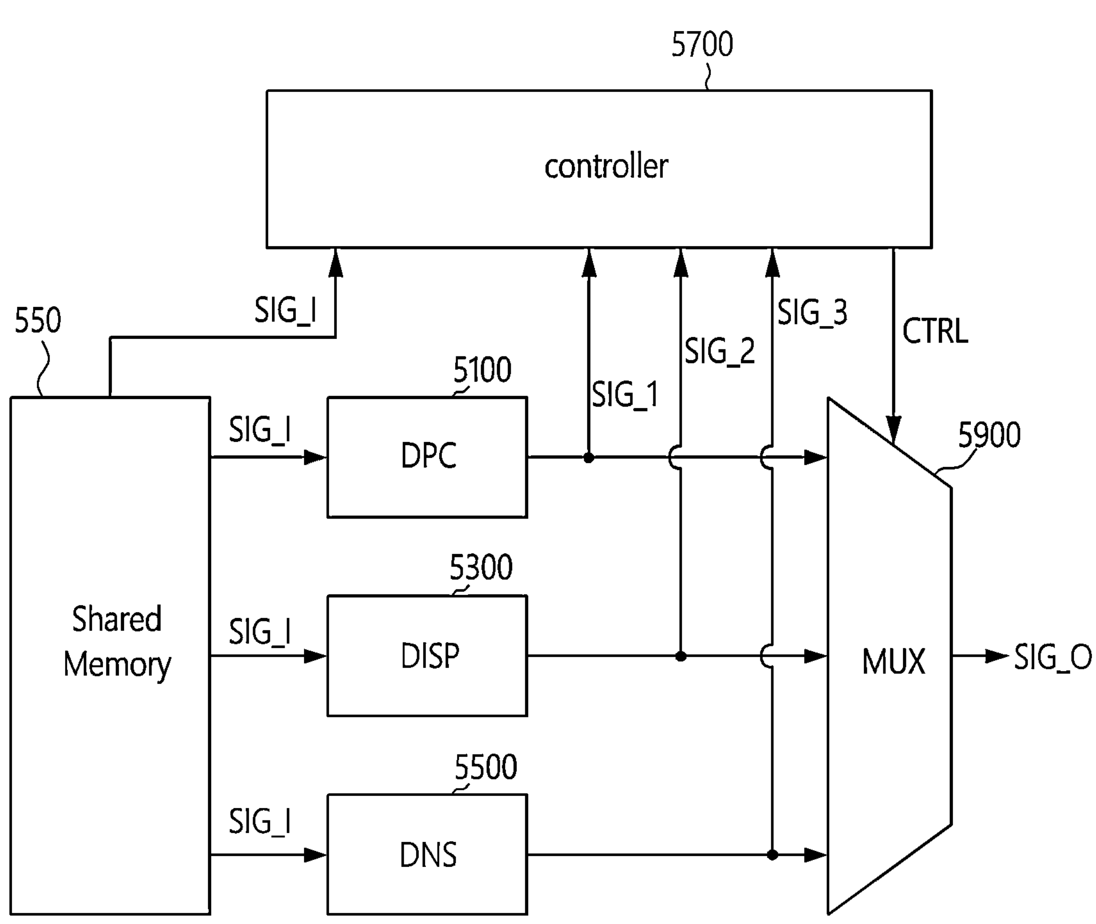
FIG. 6 is a block diagram illustrating the system on chip of FIG. 1 according to some embodiments.

In some embodiments, the image signal processor 500 may include a DPC module (see 5100 of FIG. 6), a DISP module (see 5300 of FIG. 6), and a DNS module (see 5500 of FIG. 6).

In this case, the image signal processor 500 may be implemented by a processor, such as a CPU and ASIC, and the DPC module 5100, the DISP module 5300 and the DNS module 5500, which are included in the image signal processor 500, may be implemented by a processor and are not limited to a particular type of hardware implementation. The operation and effect of each module will be described below.

In some embodiments, the image sensor 30 and the image signal processor 500 may be disposed to be separated from each other as shown. For example, the image sensor 30 may be mounted on a first chip and the image signal processor 500 may be mounted on a second chip, so that the image sensor 30 and the image signal processor 500 may communicate with each other via a predetermined interface, but the embodiments are not limited thereto. The image sensor 30 and the image signal processor 500 may be implemented as a single package, for example, a multi-chip package (MCP).

The memory 70 may store the image signal processed by the system on chip 50.

The display 90 may output the image processed by the system on chip 50. The display 90 includes all devices capable of outputting or displaying the image. For example, the display 90 may mean a computer, a mobile communication device, and other video output terminals.

Figure 3:
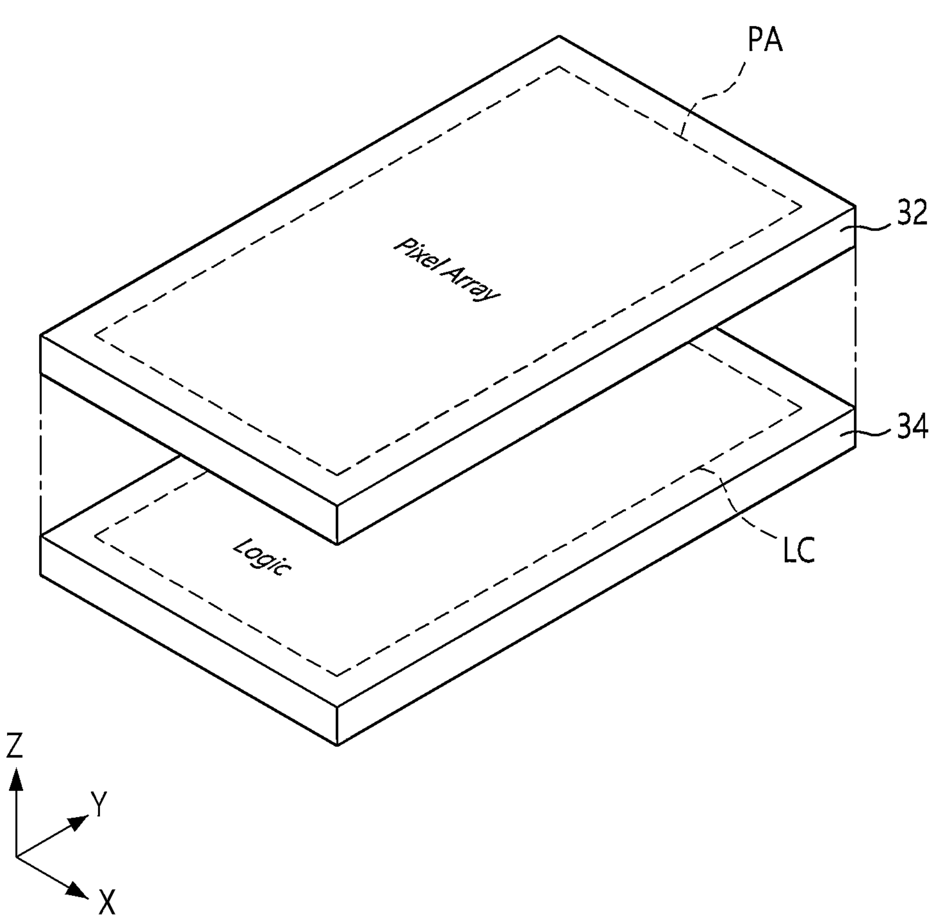
FIG. 3 is a view illustrating a conceptual layout of an image sensor according to some embodiments.

FIG. 3 is a view illustrating a conceptual layout of an image sensor according to some embodiments.

Referring to FIG. 3, the image sensor 30 of the present embodiment may include an upper chip 32 and a lower chip 34, which are stacked. A plurality of pixels may be disposed in the upper chip 32 in a two-dimensional array structure. That is, the upper chip 32 may include a pixel array PA. The lower chip 34 may include a logic area LC and a memory area. The lower chip 34 may be disposed below the upper chip 32, and may be electrically connected to the upper chip 32. The lower chip 34 may allow a pixel signal transferred or communicated from the upper chip 32 to be transferred or communicated to the logic area LC of the lower chip 34.

Logic elements may be disposed in the logic area LC of the lower chip 34. The logic elements may include circuits for processing pixel signals from the pixels. For example, the logic elements may include the control register block 310, the timing generator 320, the row driver 330, the readout circuit 350 and the ramp signal generator 360 of FIG. 2.

Figure 4:
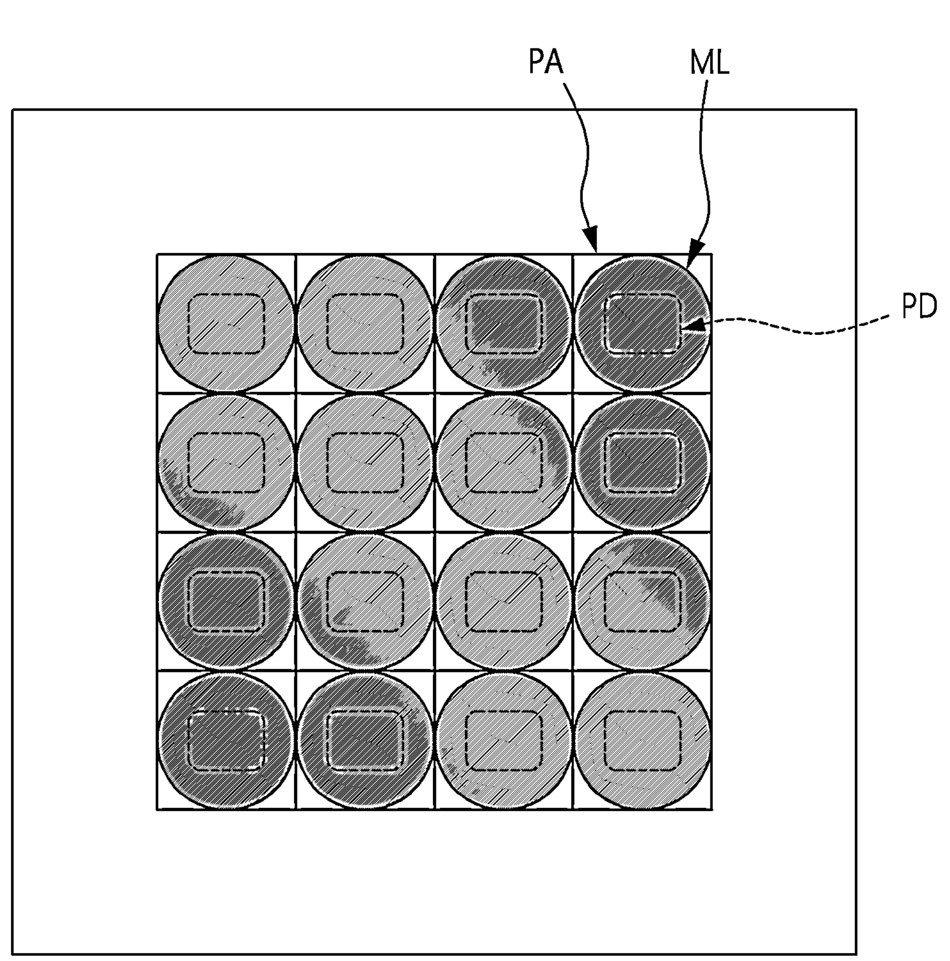
FIG. 4 is a top or plan view of the image sensor shown in FIG. 3 according to some embodiments.
Figure 4:
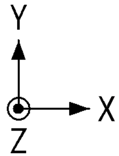

FIG. 4 is a top view of the image sensor shown in FIG. 3 according to some embodiments. FIG. 5 is a view illustrating a pixel array of FIG. 4 according to some embodiments.

Referring to FIG. 4, the pixel array PA may be disposed on an upper surface of the image sensor 30. In more detail, the pixel array PA may be disposed on an upper surface of the upper chip 32 of the image sensor 30. The pixel array PA may receive incident light. The pixel array PA may include a photodiode PD and a micro-lens ML, which are disposed for each pixel. The photodiode PD may be disposed in a substrate included in the pixel array PA. The photodiode PD corresponds to a photoelectric conversion unit, and may convert light incident on the pixel array PA into electric charges. The micro-lens ML may be disposed for each photodiode PD. That is, the micro-lens ML may be disposed for each pixel of the pixel array PA, and may receive light. The light passing through the micro-lens ML may be transferred to the photodiode PD. Although the pixels of the pixel array PA are regularly arranged in a first direction X and a second direction Y, the embodiments of the present disclosure are not limited thereto.

Referring to FIG. 5, the pixel array PA may include first to fourth green-red pixels GR1 to GR4, first to fourth red pixels R1 to R4, first to fourth blue pixels B1 to B4, and first to fourth green-blue pixels GB1 to GB4. A plurality of pixels of the pixel array PA may be arranged in an RGB Bayer pattern. For example, green pixels including the first to fourth green-red pixels GR1 to GR4 and the first to fourth green-blue pixels GB1 to GB4 may surround red pixels including the first to fourth red pixels R1 to R4 and blue pixels including the first to fourth blue pixels B1 to B4. In this way, the plurality of pixels of the pixel array PA may be regularly arranged, but the embodiment of the present disclosure is not limited thereto. The pixel array PA may be arranged in an RGB tetra pattern or a nona pattern.

The first to fourth green-red pixels GR1 to GR4 may output first to fourth green-red pixel signals respectively corresponding thereto. The first to fourth green-blue pixels GB1 to GB4 may output first to fourth green-blue pixel signals respectively corresponding thereto. The first to fourth red pixels R1 to R4 may output first to fourth red pixel signals respectively corresponding thereto. The first to fourth blue pixels B1 to B4 may output first to fourth blue pixel signals respectively corresponding thereto. That is, an image signal or a pixel signal SIG_PX of one frame, which is output by the pixel array PA, may include the first to fourth green-red pixel signals, the first to fourth green-blue pixel signals, the first to fourth red pixel signals and the first to fourth blue pixel signals.

FIG. 6 is a block diagram illustrating the system on chip of FIG. 1 according to some embodiments.

Referring to FIG. 6, a system on chip 50 may include a shared memory 550, a Defective pixel correction (DPC) module 5100, a Disparity Correction (DISP) module 5300, a Denoising (DNS) module 5500, a controller 5700, and a multiplexer 5900. The components included in the system on chip 50 may be implemented by a processor, and are not limited to hardware.

The system on chip 50 may receive an image pixel signal SIG_PX from the image sensor 30. The shared memory 550 may store a kernel to check whether a particular pixel included in the image pixel signal SIG_PX is corrected and calculate an appropriate value. The kernel may include values of N×N pixels near the corresponding pixel (N is a natural number greater than or equal to 1).

The DPC module 5100, the DISP module 5300 and the DNS module 5500 may perform computation for the kernel stored in the shared memory 550. As the DPC module 5100, the DISP module 5300 and the DNS module 5500 share the memory, a hardware area included in the memory may be efficiently reduced.

The DPC module 5100 may check whether a central pixel in the kernel is a defective pixel having a significant difference in a value from a peripheral pixel value. The operation of the DPC module 5100 will be described later.

When the central pixel corresponds to the defective pixel, an appropriate value for the corresponding pixel may be found in accordance with information (for example, direction, flat, noisy, saturation, static BP, PDAF, etc.) which may be found using the pixel in the kernel, so that the corresponding pixel may be corrected.

The DISP module 5300 may perform a function of reducing or preventing a cross-talk phenomenon that occurs due to a difference in sensitivity between the green-red pixel and the green-blue pixel. The cross-talk phenomenon refers to a phenomenon in which image quality is not clearly implemented in accordance with an interference effect between pixels. The operation of the DISP module 5300 will be described later.

The DNS module 5500 may reduce noise in a pixel by using information that may be found using the pixel in the kernel. The result of the computation may be, for example, a pixel average, a local channel compensation, or an edge preserving, but the embodiments according to the present disclosure are not limited thereto. The operation of the DNS module 5500 will be described below.

The DPC module 5100, the DISP module 5300, and the DNS module 5500 have their respective regions of interest (ROIs) that are different from one another. For example, the region of interest of the DPC module 5100 may correspond to a defective pixel. The region of interest of the DISP module 5300 may correspond to a cross-talk artifact. The region of interest of the DNS module 5500 may correspond to the overall noise in the image.

As the regions of interest of the respective modules 5100, 5300 and 5500 included in the system on chip 50 are different from one another, quality of an image may be maintained as much as possible even though results obtained by respective functions are mixed.

The DPC module 5100, the DISP module 5300 and the DNS module 5500 may operate independently. That is, the DPC module 5100, the DISP module 5300 and the DNS module 5500 may operate in parallel. For example, the DPC module 5100 and the DISP module 5300 may operate at the same time, but the embodiments according to the present disclosure are not limited thereto.

The results of the DPC module 5100, the DISP module 5300 and the DNS module 5500 are independent of one another. That is, the result of each module does not affect the operation of the other modules. For example, the result according to the DISP module 5300 does not affect the operation of the DNS module 5500.

The controller 5700 may receive an input signal SIG_1 from the shared memory 550, a first result signal SIG_1 from the DPC module 5100, a second result signal SIG_2 from the DISP module 5300, and a third result signal SIG_3 from the DNS module 5500. The controller 5700 may compare pixel values of the first to third result signals SIG_1 to SIG_3 for each pixel with a pixel value of the input signal SIG_I. The controller 5700 may generate a control signal CTRL to select a result signal having the greatest absolute difference.

The multiplexer 5900 may select any one of the first result signal SIG_1, the second result signal SIG_2 and the third result signal SIG_3, which are the result values of the DPC module 5100, the DISP addition module 5300, and the DNS module 5500, by the control signal CTRL received from the controller 5700 as an output signal SIG_O. For example, when the control signal CTRL is 0, the output signal SIG_O may be the first result signal SIG_1, but the embodiments according to the present disclosure are not limited thereto.

As a result, any one of the result values according to the plurality of modules may be selectively used for each pixel of the pixel signals, which have passed through the image sensor, while each pixel is passing through the system on chip 50. For example, the result value of the DPC module 5100 may be selected and output for any one of pixels sequentially stored in the shared memory 550, and the result value of the DISP module 5300 may be selected and output for another pixel.

Therefore, the output signal of the system on chip 50 may be a signal in which results of various functions are selectively output for each pixel.

Figure 7:
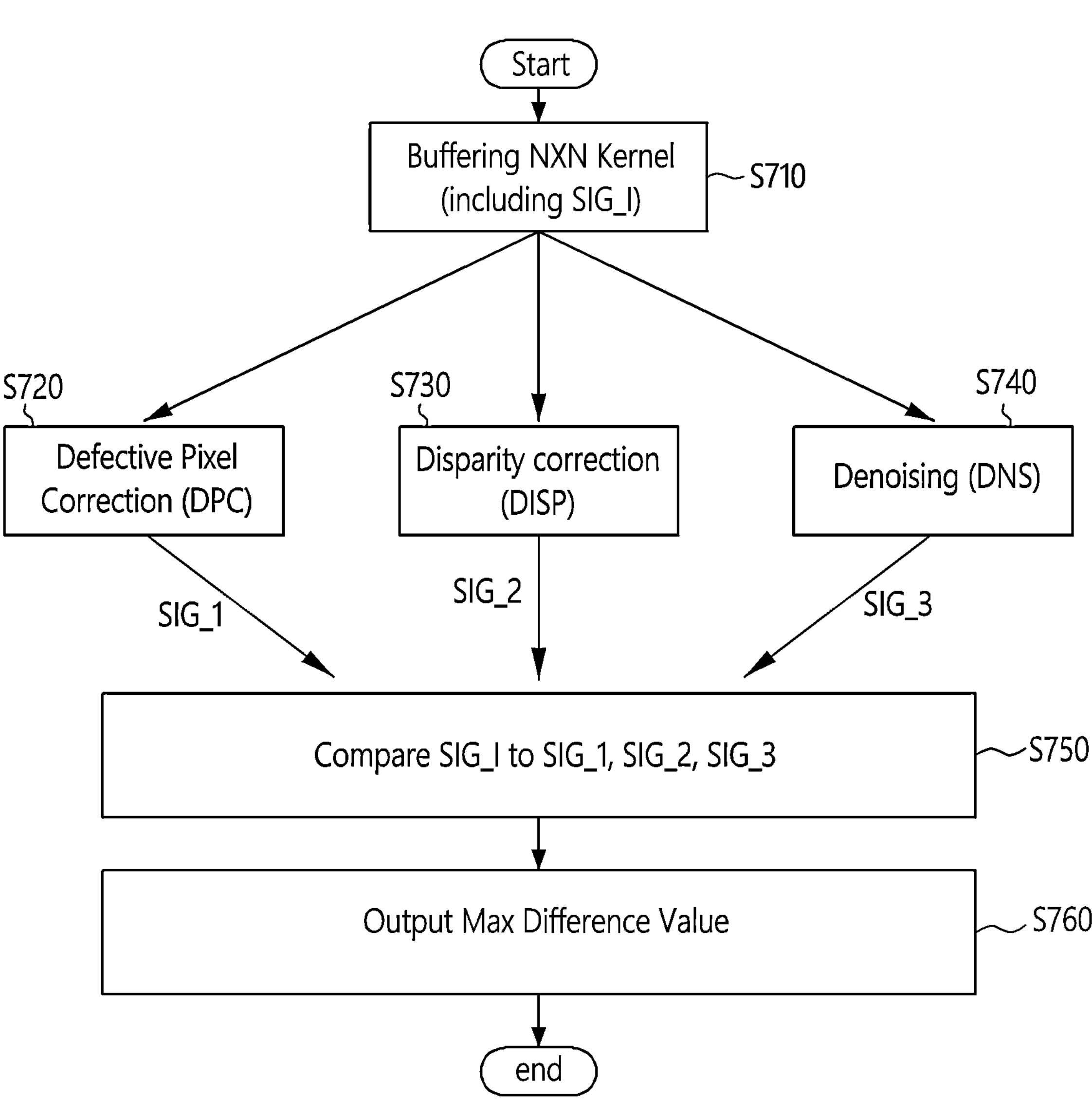
FIG. 7 is a flow chart illustrating a method of operating a system on chip according to some embodiments.

FIG. 7 is a flow chart illustrating a method of operating a system on chip according to some embodiments.

Referring to FIGS. 6 and 7, the pixel signals SIG_PX passing through the image sensor (see 30 of FIG. 1) are sequentially buffered in the shared memory 550 in the form of an input signal SIG_I (S710). In this case, the pixel signal SIG_PX is one frame of an image, and may be a target signal to which each function is to be applied.

The input signal SIG_I stored in the shared memory 550 corresponds to a signal in the form of an N×N kernel. In this case, N corresponds to a natural number equal to or greater than 1. A method for generating a kernel will be described as follows.

The N×N kernel means that it includes N×N pixels near the central pixel based on the central pixel. Therefore, the kernel may correspond to a portion of the pixel signal SIG_PX.

At this time, in case of N×N kernels for a pixel at an edge of the pixel signal SIG_PX, pixel values at a position in which adjacent pixels do not exist may be determined in a way of duplicating pixel values of the adjacent pixels that do exist, whereby the kernel may be generated.

The input signal SIG_I is stored in the shared memory 550. In addition, the input signal SIG_I in the shared memory 550 is not changed by the function of the module included in the system on chip 50 and the result thereof.

As the input signal SIG_I is stored in the shared memory 550, each of the modules 5100, 5300 and 5500 of the system on chip 50 may perform computation by using the same input signal SIG_I. Therefore, the hardware area included in the memory may be efficiently reduced.

The input signal SIG_I stored in the shared memory 550 may be transmitted or communicated to each of the DPC module 5100, the DISP module 5300 and the DNS module 5500.

The DPC module 5100 detects whether the central pixel in the N×N kernel corresponds to a defective pixel having a significant difference in a value from the peripheral pixel value, through the input signal SIG_I transmitted thereto, and performs correction (S720). The DPC module 5100 that has performed the operation outputs the first result signal SIG_1. A detailed operation of the DPC module 5100 will be described below with reference to FIG. 8.

The DISP module 5300 corrects a cross-talk phenomenon, which occurs due to a difference in sensitivity between the green-red pixel and the green-blue pixel, through the input signal SIG_I transmitted thereto (S730). The DISP module 5300 that has performed the operation outputs the second result signal SIG_2. A detailed operation of the DISP module 5300 will be described later with reference to FIG. 13.

The DNS module 5500 performs correction for reducing noise with respect to the central pixel in the N×N kernel through the input signal SIG_I transmitted thereto (S740). The DNS module 5500 that has performed the operation outputs the third result signal SIG_3. A detailed operation of the DNS module 5500 will be described below with reference to FIGS. 17 and 18.

Afterwards, the system on chip 50 compares the first to third result signals SIG_1 to SIG_3 with the input signal SIG_I (S750).

In more detail, an absolute value of a value obtained by subtracting the pixel value of the first result signal SIG_1 from the central pixel value of the input signal SIG_1, an absolute value of a value obtained by subtracting the pixel value of the second result signal SIG_2 from the central pixel value of the input signal SIG_I and an absolute value of a value obtained by subtracting the pixel value of the third result signal SIG_3 from the central pixel value of the input signal SIG_I are calculated.

One of the first to third result signals SIG_1 to SIG_3, which has the greatest difference in absolute value from the input signal SIG_I, is output (S760).

The processes described above are repeated for all pixels included in the pixel signals SIG_PX. Therefore, each of the pixels may be corrected by using any one of the first to third result signals SIG_1 to SIG_3.

Figure 8:
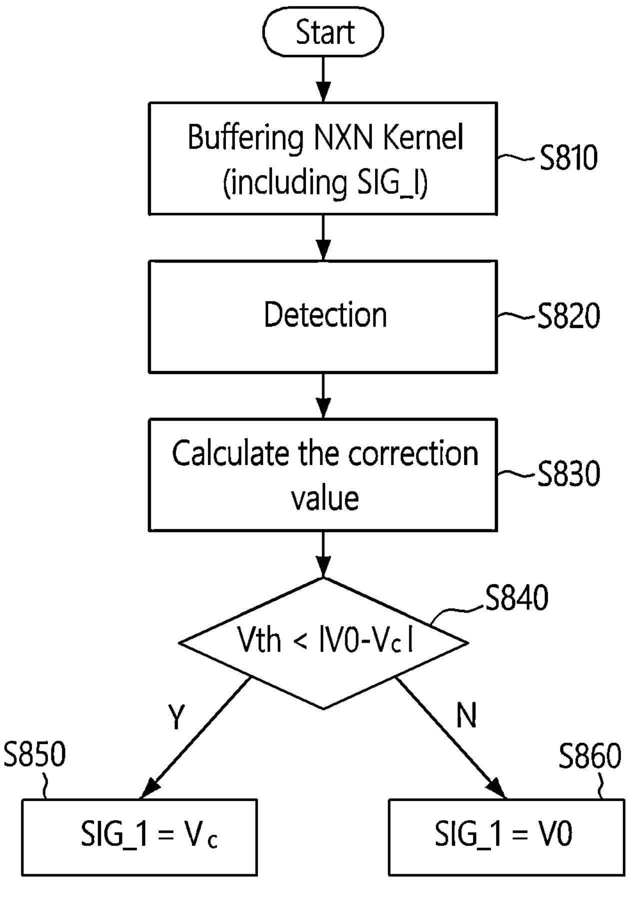
FIG. 8 is a flow chart illustrating a method of operating the DPC module of FIG. 6.

FIG. 8 is a flow chart illustrating a method of operating the DPC module of FIG. 6 according to some embodiments.

Referring to FIG. 8, the pixel signals SIG_PX passing through the image sensor (see 30 of FIG. 1) are sequentially buffered in the shared memory 550 in the form of the input signal SIG_I (S810). In this case, the pixel signal SIG_PX is one frame of an image, and may be a target signal to which each function is to be applied.

The input signal SIG_I stored in the shared memory 550 corresponds to a signal in the form of an N×N kernel. In this case, N corresponds to a natural number equal to or greater than 1. The kernel may correspond to a portion of the pixel signal SIG_PX.

The DPC module 5100 checks whether the central pixel corresponds to a defective pixel through information (for example, direction, flat, noisy, saturation, etc.), which may be found by using a peripheral pixel in the N×N kernel, or external information (S820). For example, the external information may be information of the defective pixel by the image sensor 30, but the embodiments according to the present disclosure are not limited thereto.

When it is determined that the central pixel in the N×N kernel corresponds to a defective pixel, the DPC module 5100 calculates a correction value obtained by correcting the pixel value of the defective pixel, based on information, which may be found by using the peripheral pixel and external information (S830). For example, the pixel value before the correction of the defective pixel may be V0, and the correction value corrected in accordance with the peripheral pixel and the external information may be Vc.

The DPC module 5100 determines whether a difference in absolute value between the pixel value V0 before the correction of the defective pixel and the correction value Vc exceeds a threshold value Vth (S840).

When the difference in absolute value between the pixel value V0 before the correction of the defective pixel and the correction value Vc is greater than the threshold value Vth (Y), the pixel value of the first result signal SIG_1, which is an output value of the DPC module 5100, corresponds to the correction value Vc (S850). For example, when the difference, that is, $|V0-Vc|$, in absolute value between the pixel value V0 before the correction of the defective pixel and the correction value Vc is greater than a preset threshold value Vth, the pixel value of the first result signal SIG_1, which is an output signal of the DPC module 5100, corresponds to the correction value Vc.

On the other hand, when the difference in absolute value between the pixel value V0 before the correction of the defective pixel and the correction value Vc is less than or equal to the preset threshold value Vth (N), the pixel value of the first result signal SIG_1, which is the output value of the DPC module 5100, corresponds to the pixel value V0 before the correction of the defective pixel (S860). For example, when $|V0-Vc|$ is less than or equal to the preset threshold value Vth, the pixel value of the first result signal SIG_1 that is the output signal of the DPC module 5100 corresponds to the pixel value V0 before the correction of the defective pixel.

FIGS. 9 to 12 are views illustrating an operation of a DPC module according to some embodiments.

Referring to FIGS. 9 to 12, the kernel may include a green-red pixel, a red pixel, a blue pixel, and a green-blue pixel.

Referring to FIG. 9, the input signal SIG_I may be a kernel in the form of N×N based on a central pixel GR5. In the drawings, the input signal SIG_I is shown in the form of 5×5, but embodiments are not limited thereto. For example, the input signal SIG_I may be in the form of 7×7 based on the central pixel GR5.

The DPC module (see 5100 of FIG. 6) determines whether the central pixel GR5 corresponds to a defective pixel within the input signal SIG_I buffered in the shared memory 550. Therefore, the region of interest (ROI) of the DPC module 5100 corresponds to a defective pixel.

Referring to FIGS. 8 and 10, whether the central pixel GR5 corresponds to the defective pixel may be determined by whether the central pixel in the kernel has a remarkable difference from values of peripheral pixels GR1, GB1, GR2, GB2, GR3, GR4, GB4, GB5, GR6, GR7, GR8 and GR9 by using the peripheral pixels GR1, GB1, GR2, GB2, GR3, GR4, GB4, GB5, GR6, GR7, GR8 and GR9 in the kernel (S820). In addition, when it is determined that the central pixel GR5 in the kernel corresponds to a defective pixel, a correction value obtained by correcting a pixel value of the defective pixel may be calculated based on information, which may be found by using the peripheral pixels GR1, GB1, GR2, GB2, GR3, GR4, GB4, GB5, GR6, GR7, GR8 and GR9, and external information (S830).

Figures 11, 12:
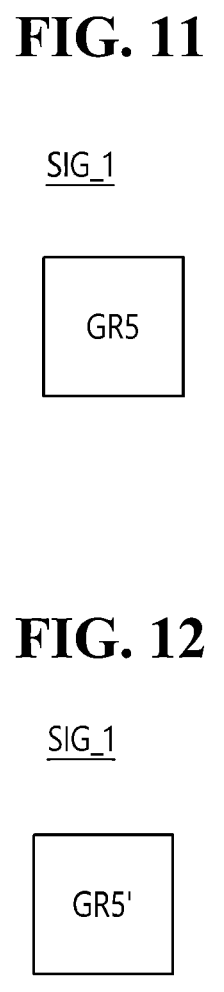

Referring to FIGS. 8 and 11, when the difference in absolute value between the pixel value V0 before the correction of the defective pixel and the correction value Vc is less than or equal to the threshold value Vth, the pixel value of the first result signal SIG_1 that is the output signal of the DPC module 5100 corresponds to a signal that is the pixel value V0 before the correction of the defective pixel. For example, the pixel value of the first result signal SIG_1 of the DPC module 5100 for the defective pixel including GR5 may be V0.

Referring to FIGS. 8 and 12, when the difference in absolute value between the pixel value V0 before the correction of the defective pixel and the correction value Vc is greater than the threshold value Vth, the pixel value of the first result signal SIG_1 that is the output signal of the DPC module 5100 corresponds to a signal that is the correction value Vc. For example, the pixel value of the first result signal SIG_1 of the DPC module 5100 for the defective pixel including GR5' may be Vc.

Figure 13:
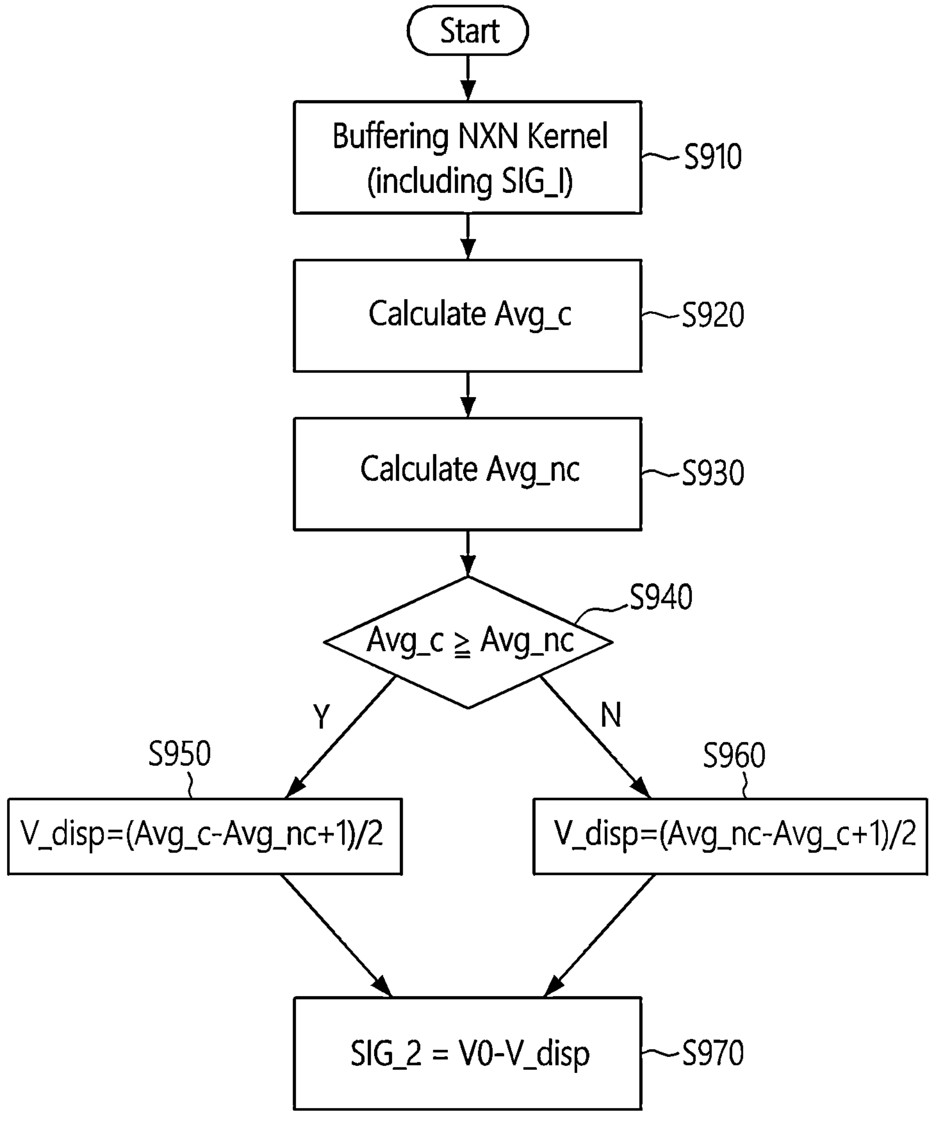
FIG. 13 is a flow chart illustrating a method for operating the DISP module of FIG. 6 according to some embodiments.

FIG. 13 is a flow chart illustrating a method for operating the DISP module of FIG. 6.

Referring to FIG. 13, the pixel signals SIG_PX passing through the image sensor (see 30 of FIG. 1) are sequentially buffered in the shared memory 550 in the form of the input signal SIG_I (S910). In this case, the pixel signal SIG_PX is one frame of an image, and may be a target signal to which each function is to be applied.

The input signal SIG_I stored in the shared memory 550 corresponds to a signal in the form of an N×N kernel. In this case, N corresponds to a natural number equal to or greater than 1. The kernel may correspond to a portion of the pixel signal SIG_PX.

The DISP module 5300 may correct a cross-talk phenomenon, which occurs in the pixel value V0 before the correction of the target pixel in the N×N kernel, by an appropriate difference correction value Vdisp.

To obtain the difference correction value Vdisp, a central average value Avg_c is first calculated by using the pixel value of the green-red pixel or the green-blue pixel in accordance with a type of the central pixel in the N×N kernel (S920). For example, when the central pixel is the green-red pixel, the central average value Avg_c may be calculated by using the green-red pixel included in the peripheral pixel.

Then, a peripheral average value Avg_nc is calculated by using the pixel value of the green-blue pixel or the green-red pixel of the peripheral pixel in the N×N kernel (S930). For example, when the central average value Avg_c is calculated by using the green-red pixel included in the peripheral pixel, the peripheral average value Avg_nc may be calculated by using the green-blue pixel of the peripheral pixel. On the contrary, when the central average value Avg_c is calculated by using the green-blue pixel included in the peripheral pixel, the peripheral average value Avg_nc may be calculated by using the green-red pixel of the peripheral pixel.

The calculated central average value Avg_c and the peripheral average value Avg_nc are compared with each other (S940).

When the central average value Avg_c is equal to or greater than the peripheral average value Avg_nc (Y), the difference correction value Vdisp is determined as follows (S950).

$$V_{disp} = (\text{Avg\_c} - \text{Avg\_nc} + 1)/2$$

On the other hand, when the central average value Avg_c is less than the peripheral average value Avg_nc (N), the difference correction value Vdisp is determined as follows operation (S960).

$$V_{disp} = (\text{Avg\_nc} - \text{Avg\_c} + 1)/2$$

The pixel value of the second result signal SIG_2 output from the DISP module 5300 is determined as follows by the calculated difference correction value Vdisp (S970).

$$\text{SIG\_2} = V0 - V_{disp}$$

Figure 16:
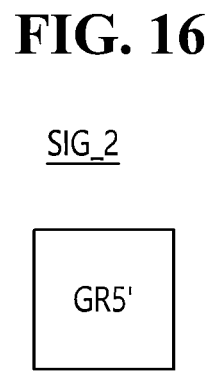

FIGS. 14 to 16 are views illustrating an operation of a DISP module according to some embodiments.

Referring to FIGS. 14 to 16, the DISP module 5300 operates only for the green-red pixel or the green-blue pixel but does not operate for the red pixel or the blue pixel.

Referring to FIGS. 13 and 14, when the central pixel GR5 is the green-red pixel, the central average value Avg_c may be calculated using the green-red pixels included in the peripheral pixels. In the drawings, only the green-red pixels are used in calculating the central average value Avg_c, but embodiments of the present disclosure are not limited thereto. When the central pixel GR5 is the green-blue pixel, the central average value Avg_c may be calculated by using the green-blue pixels included in the peripheral pixels.

Referring to FIGS. 13 and 15, when the central pixel is the green-red pixel, the peripheral average value Avg_nc may be calculated using the green-blue pixels of the peripheral pixels. For example, when the central average value Avg_c is calculated using the green-red pixels, the peripheral average value Avg_nc is calculated using the green-blue pixels. On the contrary, when the central average value Avg_c is calculated using the green-blue pixels, the peripheral average value Avg_nc is calculated using the green-red pixels. In the drawings, only the green-blue pixels are used in calculating the peripheral average value Avg_nc, but embodiments of the present disclosure are not limited thereto. When the central pixel is the green-blue pixel, the peripheral average value Avg_nc may be calculated by using the green-red pixels.

Referring to FIGS. 13 and 16, the pixel value of the second result signal SIG_2 that is the output signal of the DISP module 5300 corresponds to a value obtained by subtracting the difference correction value Vdisp from the pixel value V0 before the correction. For example, the pixel value of the second result signal SIG_2 of the DISP module 5300 with respect to the central pixel GR5' may be V0-Vdisp.

Figure 18:
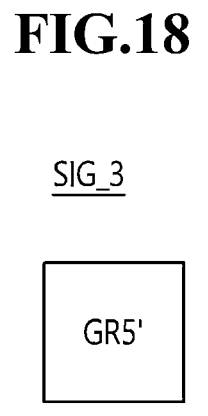

FIGS. 17 and 18 are views illustrating an operation of a DNS module according to some embodiments.

Referring to FIGS. 17 and 18, the DNS module 5500 performs a function of attenuating noise to remove noise that may degrade quality of an image.

Various functions may be used in the DNS module 5500 depending on the type of noise, the required Noise Reduction (NR) strength, an allowable calculation cost, and the like to attenuate noise. For example, the functions used in the DNS module 5500 may include, but are not limited to, a Gaussian filter, an average filter, a median filter, a non-local mean filter, and the like.

The DNS function may reduce or remove noise by synthesizing computation results using information (for example, pixel average, local channel compensation, edge preserving, etc.), which may be found by itself in the image, and external information (for example, motion, temporal, etc.).

The method of computation may vary depending on the DNS function. For example, in case of a weight average filter, the pixel value of the third result signal SIG_3 output from the input signal SIG_I through the DNS module 5500 is determined as follows. For example, the pixel value of the third result signal SIG_3 of the DNS module 5500 with respect to the central pixel GR5' may be $$\frac{\sum_k W(k) \cdot P(k)}{\sum_k W(k)}.$$

$$\text{SIG\_3} = \frac{\sum_k W(k) \cdot P(k)}{\sum_k W(k)},$$

All k∈ search range

Figure 19:
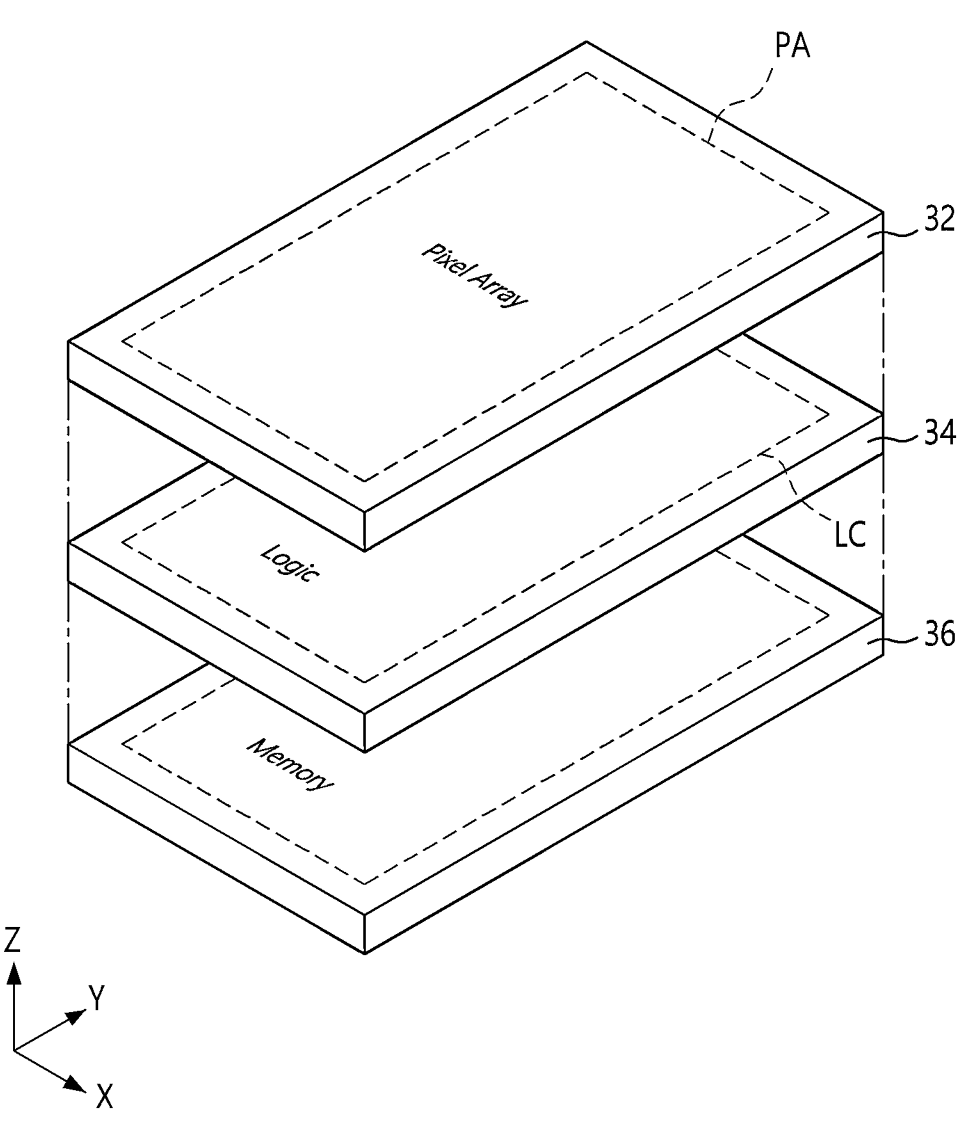
FIG. 19 is a view illustrating a conceptual layout of an image sensor according to some embodiments.

FIG. 19 is a view illustrating a conceptual layout of an image sensor according to some embodiments.

For convenience of description, repeated portions of those features described with reference to FIGS. 1 to 18 will be briefly described or omitted.

Referring to FIG. 19, an image sensor 30' may include an upper chip 32, a lower chip 34 and a memory chip 36. In this case, the upper chip 32, the lower chip 34 and the memory chip 36 may be sequentially stacked along a third direction Z. The memory chip 36 may be disposed below the lower chip 34. The memory chip 36 may include a memory device. For example, the memory chip 36 may include a volatile memory device, such as DRAM and SRAM. The memory chip 36 may receive signals from the upper chip 32 and the lower chip 34 and process the signals through the memory device. That is, the image sensor 30', which includes the memory chip 36, may correspond to a three-stack image sensor.

Figure 20:
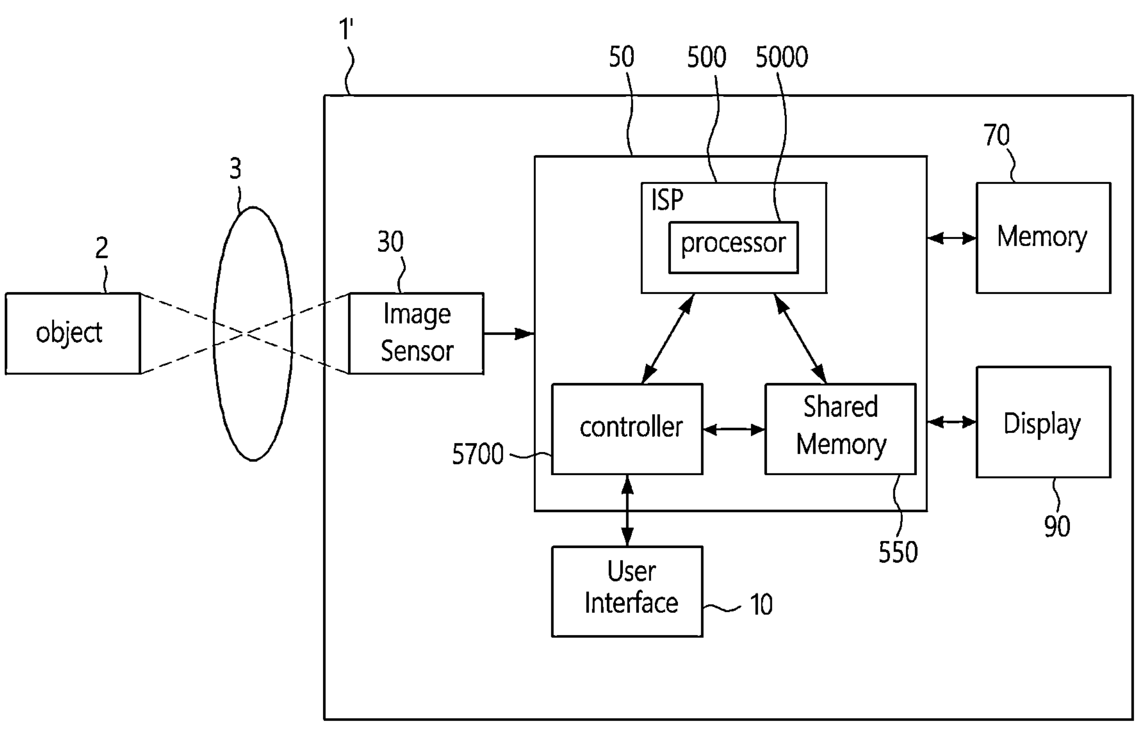
FIG. 20 is a block diagram illustrating an image sensing device according to some embodiments.

FIG. 20 is a block diagram illustrating an image sensing device according to some embodiments.

For convenience of description, repeated portions of those features described with reference to FIGS. 1 to 19 will be briefly described or omitted.

Referring to FIG. 20, an image sensing device 1' may further include a user interface 10.

Therefore, the image sensing device 1' may receive an external signal from a user through the user interface 10.

Figure 21:
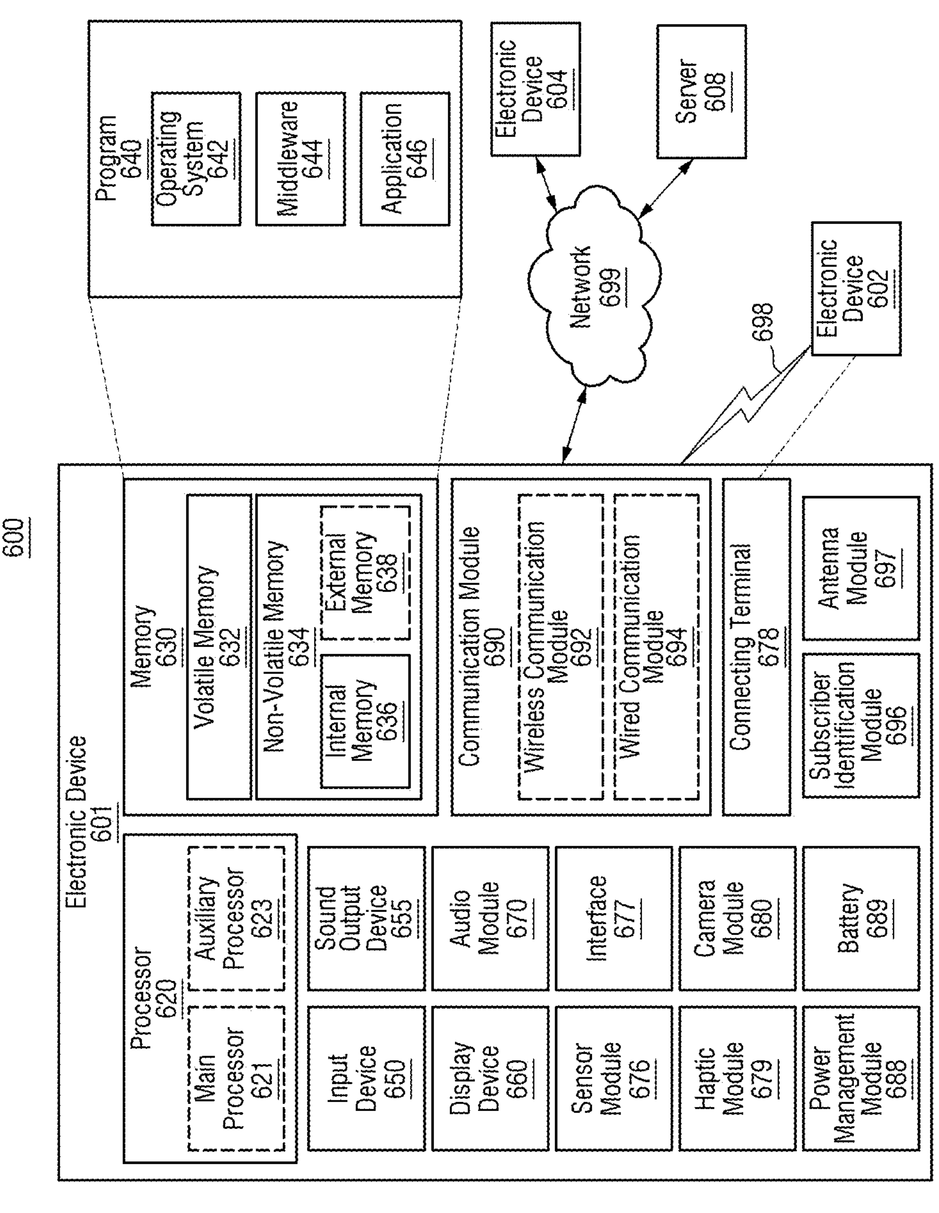
FIG. 21 is a block diagram illustrating an electronic device according to some embodiments.

FIG. 21 is a block diagram illustrating an electronic device according to some embodiments.

An electronic device 601 in a network environment 600 may perform communication with an electronic device 602 through a first network 698, such as a short-range wireless communication network, or may perform communication with an electronic device 604 or a server 608 through a second network 699 such as a long-range wireless communication network.

The electronic device 601 may perform communication with the electronic device 604 through the server 608. The electronic device 601 includes a processor 620, a memory 630, an input device 650, a sound output device 655, a display device 660, an audio module 670, a sensor module 676, an interface 677, a connecting terminal 678, a haptic module 679, a camera module 680, a power management module 688, a battery 689, a communication module 690, a subscriber identification module (SIM) 696, an antenna module 697 or the like.

In some embodiments, at least one of the components, such as the display device 660 or the camera module 680 may be omitted from the electronic device 601, or one or more other components may be added to the electronic device 601.

In some embodiments, some of the components may be integrated into a single integrated circuit (IC). For example, the sensor module 676, such as a fingerprint sensor, an iris sensor and an illuminance sensor may be embedded in the display device, such as a display.

The processor 620 may perform a variety of data processing or computations by executing software (e.g., program 640) for controlling other components of at least one electronic device 601 such as hardware or software components connected to the processor 620.

In performing at least a portion of data processing or computations, the processor 620 may load commands or data received from another component, such as the sensor module 676 or the communication module 690, in a volatile memory 632, process the commands or data stored in the volatile memory 632, and store result data in a non-volatile memory 634.

The processor 620 may include a main processor 621, such as a central processing unit (CPU) or an application processor (AP), and an auxiliary processor 623 operated independently of the main processor 621 or operated as being associated with the main processor 621.

The auxiliary processor 623 may include, for example, a graphic processing unit (GPU), an image signal processor (ISP), a sensor hub processor or a communication processor (CP). The auxiliary processor 623 may include the above-described processor (5000 of FIG. 1).

In some embodiments, the auxiliary processor 623 may be configured to consume less power than the main processor 621 or execute a particular function. The auxiliary processor 623 may be implemented separately from the main processor 621 or implemented as a portion of the main processor 621.

The auxiliary processor 623 may control at least some of functions or operational states related to at least one of the components of the electronic device 601 on behalf of the main processor 621 while the main processor 621 is in an inactive state or together with the main processor 621 while the main processor 621 is in an active state.

The memory 630 may store various data used for at least one component of the electronic device 601. The data may include, for example, software of the program 640, and input data and output data for commands related to the software. The memory 630 may include a volatile memory 632 or a non-volatile memory 634.

The program 640 may be stored as software in the memory 630, and may include, for example, an operating system (OS) 642, a middleware 644, or an application 646.

The input device 650 may receive commands or data to be used for another component of the electronic device 601 from the outside of the electronic device 601, e.g., from a source that is external to the electronic device 601. The input device 650 may include, for example, a microphone, a mouse, or a keyboard, and the input device 650 may include a plurality of microphones.

The sound output device 655 may output a sound signal to the outside of the electronic device 601, e.g., to a destination that is external to the electronic device 601. The sound output device 655 may include, for example, a speaker. Multimedia data may be output through the speaker.

The display device 660 may visually provide information to the outside of the electronic device 601, e.g., to a destination that is external to the electronic device 601. The display device 660 may include, for example, a display, a hologram device or a projector, and a control circuit for controlling a corresponding one of the display, the hologram device, and/or the projector.

In some embodiments, the display device 660 may include a touch circuit configured to sense a touch, or a sensor circuit, such as a pressure sensor, configured to measure strength of a force generated by the touch.

The audio module 670 may convert sound into an electrical signal, or vice versa. In some embodiments, the audio module 670 may obtain sound via the input device 650, or may output sound via the sound output device 655 or a headphone of the external electronic device 602 directly or wirelessly connected to the electronic device 601.

The sensor module 676 may sense an operating state (e.g., power or temperature) of the electronic device 601 or an external environment state (e.g., user state) of the electronic device 601, and may generate an electrical signal or data value corresponding to the sensed state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor. The sensor module 676 may include the above-described image sensor (30 of FIG. 1).

The interface 677 may support one or more prescribed protocols to be used by the electronic device 601 directly or wirelessly connect to the external electronic device 602. In some embodiments, the interface 677 may include, for example, a high definition multimedia interface (HDMI), a universal serial bus (USB) interface, a secure digital (SD) card interface, and/or an audio interface.

The connecting terminal 678 may include a connector through which the electronic device 601 may be physically connected to the external electronic device 602. In some embodiments, the connecting terminal 678 may include, for example, an HDMI connector, a USB connector, an SD card connector, or an audio connector (e.g., a headphone connector).

The haptic module 679 may convert an electrical signal into a mechanical stimulus, such as vibration or motion, which may be recognized by a user, through a tactile sensation or kinesthetic sensation. In some embodiments, the haptic module 679 may include, for example, a motor, a piezoelectric element, and/or an electrical stimulator.

The camera module 680 may capture a still image and motion images. In some embodiments, the camera module 680 may include one or more lenses, an image sensor, an image signal processor, and/or a flash.

The power management module 688 may manage a power supplied to the electronic device 601. For example, the power management module 688 may be implemented as at least a portion of a power management integrated circuit (PMIC), for example.

The battery 689 may supply power to at least one component of the electronic device 601. According to one embodiment, the battery 689 may include, for example, a non-rechargeable primary battery, a rechargeable secondary battery, and/or a fuel cell.

The communication module 690 may support establishment of a direct communication channel or wireless communication channel between the electronic device 601 and the external electronic device (e.g., the electronic device 602, the electronic device 604, or the server 608), and may perform communication through the established communication channel.

The communication module 690 may include one or more communication processors that are operable independently of the processor 620 and support direct communication or wireless communication.

In some embodiments, the communication module 690 may include a wireless communication module 692, such as a cellular communication module, a short-range wireless communication module or a global navigation satellite system (GNSS) communication module, or a wired communication module 694, such as a local area network (LAN) communication module or a power line communication module (PLC). In some embodiments, the wireless communication module 692 may include the above-described semiconductor device.

A corresponding communication module of these communication modules may perform communication with the external electronic device via the first network 698 (e.g., Bluetooth™, wireless fidelity (Wi-Fi) direct, and/or standard of the Infrared Data Association (IrDA)) or the second network 699 (e.g., a mobile communication network, Internet, a long-range communication network, etc.).

These various types of communication modules may be implemented as a single component, or may be implemented as a plurality of components separated from each other. The wireless communication module 692 may identify or authenticate the electronic device 601 within a communication network, such as the first network 698 or the second network 699, by using subscriber information (e.g., International Mobile Subscriber Identifier (IMSI)) stored in the subscriber identification module 696.

The antenna module 697 may transmit or receive a signal or power to or from the outside of the electronic device 601. In some embodiments, the antenna module 697 may include one or more antennas, and at least one antenna suitable for a communication scheme used in the communication network, such as the first network 698 or the second network 699, may be selected from the antennas by the communication module 690. A signal or power may be transmitted and/or received between the communication module 690 and the external electronic device via the selected at least one antenna.

At least some of the components described above may be interconnected to communicate signals therebetween via an inter-peripheral communication scheme, such as bus, general purpose input and output (GPIO), serial peripheral interface (SPI) and mobile industry processor interface (MIPI).

In some embodiments, commands or data may be transmitted or received between the electronic device 601 and an external electronic device 604 via the server 608 connected to the second network 699. The electronic devices 602 and 606 may be the same or different kinds of devices as that of the electronic device 601. All or some of the operations to be executed in the electronic device 601 may be executed in one or more external electronic devices 602 604 and/or the server 608. For example, all or some of the operations to be executed in the electronic device 601 may be executed in one or more external electronic devices 602, 604, and/or the server 608.

For example, when the electronic device 601 needs to perform functions or services automatically or in response to a request from a user or another device, the electronic device 601 may request one or more external electronic devices to perform at least a portion of the functions or services instead of executing the functions or services by itself. The one or more external electronic devices that have received the request may execute at least a portion of the requested functions or services, or an additional function or service associated with the request, and may forward the result of the execution to the electronic device 601. The electronic device 601 provides the result as at least a portion of the response to the request with or without additional process of the result. To this end, cloud computing, distributed computing or client-server computing technologies may be used, for example.

In concluding the detailed description, those skilled in the art will appreciate that many variations and modifications may be made to the example embodiments without substantially departing from the principles of the present invention. Therefore, the disclosed example embodiments of the disclosure are used in a generic and descriptive sense only and not for purposes of limitation.

What is claimed is:

1. A system on chip comprising:

a shared memory configured to store image data; and a processor configured to:

generate a first correction value by performing first image processing for a first pixel value of a first pixel of the image data received from the shared memory, generate a second correction value by performing second image processing, which is different from the first image processing, for the first pixel value of the image data received from the shared memory, generate a third correction value by performing third image processing, which is different from the first image processing and the second image processing, for the first pixel value of the image data received from the shared memory, and output a first pixel correction value that is changed from the first pixel value by comparing the first to third correction values with the first pixel value and selecting one of the first to third correction values.

2. The system on chip of claim 1, wherein the processor is configured to perform operations of generating the first to third correction values in parallel.

3. The system on chip of claim 1, wherein the first image processing includes determining whether the first pixel value has a defect by comparing a pixel value of a second pixel surrounding the first pixel with the first pixel value, and generating the first correction value obtained by correcting the defect of the first pixel value in response to determining the defect in the first pixel value.

4. The system on chip of claim 3, wherein the first image processing includes outputting the first pixel correction value that is changed from the first pixel value in response to a difference in absolute value between the first pixel value and the first correction value, which exceeds a threshold value.

5. The system on chip of claim 1, wherein a plurality of second pixels surrounding the first pixel include a plurality of first subpixels and a plurality of second subpixels, and wherein performing the second image processing includes:

comparing an average of pixel values of the first subpixels with an average of pixel values of the second subpixels, and generating the second correction value based on a difference between the average of the pixel values of the first subpixels and the average of the pixel values of the second subpixels.

6. The system on chip of claim 5, wherein the first and second subpixels include green pixels.

7. The system on chip of claim 1, wherein performing the third image processing includes:

generating the third correction value by checking noise of the first pixel.

8. The system on chip of claim 1, wherein performing the first image processing includes defective pixel correction (DPC), performing the second image processing includes disparity correction (DISP), and performing the third image processing includes denoising (DNS).

9. The system on chip of claim 1, wherein the second correction value is based on the first pixel value, and is not based on the first correction value or the third correction value.

10. The system on chip of claim 1, wherein the processor is configured to output a first pixel correction value that is changed from the first pixel value by comparing the first to third correction values with the first pixel value to select one of the first to third correction values, which has the greatest difference with the first pixel value.

11. A method for operating a system on chip, the method comprising:

generating a first correction value by performing first image processing for a first pixel value of a first pixel of first image data provided from a shared memory;

generating a second correction value by performing second image processing, which is different from the first image processing, for the first pixel value of the first image data provided from the shared memory;

generating a third correction value by performing third image processing, which is different from the first image processing and the second image processing, for the first pixel value of the first image data provided from the shared memory;

outputting a first pixel correction value that is changed from the first pixel value by comparing the first to third correction values with the first pixel value and selecting one of the first to third correction values;

generating a fourth correction value by performing the first image processing for a second pixel value of a second pixel of second image data that is different from the first image data and provided from the shared memory;

generating a fifth correction value by performing the second image processing, which is different from the first image processing, for the second pixel value of the second image data provided from the shared memory;

generating a sixth correction value by performing the third image processing, which is different from the first image processing and the second image processing, for the second pixel value of the second image data provided from the shared memory; and outputting a second pixel correction value that is changed from the second pixel value by comparing the fourth to sixth correction values with the second pixel value and selecting one of the fourth to sixth correction values.

* * * * *